United States Patent

Howarth et al.

[15] 3,686,408

[45] Aug. 22, 1972

[54] COMPOSITIONS WITH 5-NITRO-2-FURYL-ISOXAZOLES AND THEIR USE AS ANTIBACTERIAL AND ANTIFUNGAL AGENTS

[72] Inventors: Graham Arton Howarth, Wilmslow; William Hoyle, Bramhall, both of England

[73] Assignee: Ciba-Geigy Corporation, Greenburgh, N.Y.

[22] Filed: May 19, 1970

[21] Appl. No.: 36,808

Related U.S. Application Data

[62] Division of Ser. No. 571,412, Aug. 10, 1966, Pat. No. 3,562,267.

[52] U.S. Cl. ................424/272, 424/246, 424/248, 424/250, 424/267
[51] Int. Cl. ..........................A01n 9/12, A01n 9/20
[58] Field of Search......424/272, 267, 248, 246, 250; 260/307.8, 294.70, 247.2 A, 243 B, 247.5

[56] References Cited

UNITED STATES PATENTS

| | | | |
|---|---|---|---|
| 3,321,474 | 5/1967 | Kano et al. | 260/247.5 |
| 3,562,267 | 2/1971 | Howarth et al. | 260/247.5 |

*Primary Examiner*—Albert T. Meyers
*Assistant Examiner*—Leonard Schenkman
*Attorney*—Karl F. Jorda

[57] ABSTRACT

Pharmaceutical compositions comprising a compound of the class of 3-(5-nitrofur-2-yl)-5-aminoisoxazoles having a nitrile, ester, amide or urea function in the 4-position and a pharmacologically acceptable carrier are useful antibacterial and antifungal agents. A method for protecting organic materials against bacterial or fungal deterioration is provided which comprises contacting or impregnating such material with a compound as defined above.

12 Claims, No Drawings

COMPOSITIONS WITH 5-NITRO-2-FURYL-ISOXAZOLES AND THEIR USE AS ANTIBACTERIAL AND ANTIFUNGAL AGENTS

CROSS-REFERENCE TO OTHER APPLICATIONS

This is a divisional application of Ser. No. 571,412, filed Aug. 10, 1966, now U. S. Pat. No. 3,562,267.

The present invention relates to substituted heterocyclic compounds, and in particular to nitrofuryl derivatives of isoxazoles and to processes for the production of these compounds.

According to the present invention, there is provided a 5-nitro-2-furyl-isoxazole having the formula I

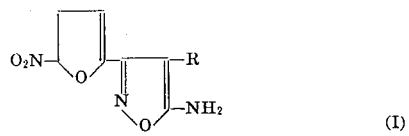

wherein R is a -CN, -CO.OR$_1$ or

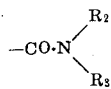

grouping, the group R$_1$ being a straight- or branched-chain alkyl group containing from one to six carbon atoms, the alkyl group being unsubstituted or hydroxyl-, alkoxy- or halogen-substituted, a straight- or branched-chain alkenyl group containing three or four carbon atoms; or a cycloalkyl group; the group R$_2$ being hydrogen and the group R$_3$ being hydrogen, a straight- or branched-chain alkyl group containing from one to 12 carbon atoms, the alkyl group being unsubstituted or hydroxyl-, alkoxy- or halogen-substituted, a straight- or branched-chain alkenyl group containing three or four carbon atoms, cycloalkyl, carbalkoxy the alkyl portion of which is a straight- or branched-chain alkyl group containing from one to five carbon atoms, or carbamoyl; or R$_2$ and R$_3$ together form a straight or branched alkylene chain containing from two to seven carbon atoms, uninterrupted or interrupted by an oxygen, nitrogen or sulphur atom.

If R$_1$ or the group R$_3$ is alkyl, each of these groups may be, for example, methyl, ethyl, n-propyl, isopropyl, n-butyl, isobutyl, secondary butyl, tertiary butyl, n-amyl, isoamyl or n-hexyl. Alkyl groups having from one to four carbon atoms are particularly preferred. If either R$_1$ or R$_3$ is an alkyl group substituted by a halogen substituent, the halogen may be fluorine or iodine but is preferably chlorine or bromine. If either R$_1$ or R$_3$ is an alkyl group which is hydroxyl-, alkoxy- or halogen-substituted, preferably the alkyl, group contains one or two halogen, alkoxy or hydroxyl substituents. If either R$_1$ or R$_3$ is an alkynyl group, this may be, for example, allyl, 2-methallyl, 2-butenyl (crotyl) or 3-butenyl. If either R$_1$ or R$_3$ is a cycloalkyl group, this may be, for example, cyclohexyl. If the group R$_3$ is a carbalkoxy group, the alkyl portion of the carbalkoxy group may be, for example, methyl, ethyl, n-propyl, isopropyl, n-butyl, isobutyl, tertiary butyl or n-amyl.

If the groups R$_2$ and R$_3$ together form an alkylene chain uninterrupted by an oxygen, nitrogen or sulphur atom, this chain may be, for example, ethylene, trimethylene, propylene, tetramethylene, methyl-substituted trimethylene, dimethyl-substituted ethylene, pentamethylene, hexamethylene, heptamethylene or dimethyl-substituted pentamethylene. If the alkylene chain is interrupted by an oxygen atom, the grouping R thus formed may be, for example, morpholinocarbonyl; if the alkylene chain formed by R$_2$ and R$_3$ together is interrupted by a nitrogen atom (preferably in the form of a grouping -NQ- where Q is hydrogen or an alkyl group having from one to three carbon atoms) or by a sulphur atom, the grouping R thus formed may be, for example, a 1-piperazinylcarbonyl- or a thiomorpholino-carbonyl grouping, respectively.

Particularly preferred compounds of the invention have the formula I wherein R is a -CN group or is a

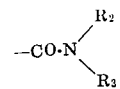

group R$_3$ being hydrogen, or a straight- or branched-chain alkyl group containing from one to five carbon atoms, unsubstituted or hydroxy-substituted or R$_2$ and R$_3$ together forming a straight- or branched alkylene chain having from two to seven carbon atoms uninterrupted or interrupted by an oxygen, nitrogen or sulphur atom.

The invention also provides a process of producing a 5-nitro-2-furyl-isoxazole of formula I, which comprises reacting a 5-nitro-2-furohydroxamoyl halide having the formula II

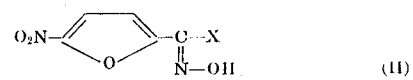

wherein X represents a halogenatom, with a reactive methylene compound having the formula III

wherein Y represents hydrogen or an alkali metal and R has the previous significance. The reaction between the 5-nitro-2-furohydroxamoyl halide and the reactive methylene compound of formula III is conveniently carried out in the presence of a basic condensation promotor, preferably sodium methoxide.

The reactive methylene compound of formula III used in the reaction may be the compound having the formula NC —CH$_2$ — R or a corresponding reactive alkali metal derivative, preferably the sodium derivative, having the formula NC — CH (M) — R wherein M is an alkali metal.

The 5-nitro-2-fluorohydroxamoyl halide of formula II is preferably the chloride or bromide. The halides may be prepared by conventional methods: the chloride may be obtained, for instance, by the method described by Doyle, Hanson, Long and Nayler in the Journal of the Chemical Society (1963) at page 5845 or by that described in Helvetica Chimica Acta (1963) volume 46 at page 1067. The halide used as starting material in the process of the invention may be a purified product or it may be the crude product so prepared, if desired, after partial purification.

The reactive methylene compound of formula III may be, for instance, malonoitrile, cyanoacetamide or an N-substituted cyanoacetamide; or an ester of cyanoacetic acid. Examples of preferred reactive methylene compounds are given in the following table in which the appropriate R substituents of formula III are stated:

| Compound | R |
| --- | --- |
| Malononitrile | CN |
| Cyanoacetamide | $CONH_2$ |
| Cyanoacetylpyrrolidine | $CO \cdot NCH_2CH_2CH_2CH_2$ |
| β-(N-cyanoacetylamino)-ethanol | $CO \cdot NH \cdot CH_2CH_2OH$ |
| Methyl cyanoacetate | $COOCH_3$ |
| Ethyl Cyanoacetate | $COOC_2H_5$ |
| Isopropyl cyanoacetate | $COOi-C_3H_7$ |
| Allyl cyanoacetate | $COOC_3H_5$ |
| N-Allyl cyanoacetamide | $CONHC_3H_5$ |
| Cyanoacetyl urea | $CONHCONH_2$ |
| β-Chloroethyl cyanoacetate | $COOCH_2CH_2Cl$ |

The present invention also provides a second process of producing a 5-nitro-2-furyl-isoxazole of formula I wherein R represents the —CN grouping, which comprises dehydrating the corresponding 5-nitro-2-furyl-isoxazole of formula I wherein R represents the —$CO \cdot NH_2$ grouping.

The dehydration may be carried out, for example, by heating at an elevated temperature, preferably at a temperature in the range of from 50°C. to the boiling point of the reaction mixture under reflux. The process is preferably carried out in the presence of a conventional agent for dehydrating carbamoyl compounds to the corresponding nitriles, for instance phosphorus oxychloride.

Although the compounds of the present invention have been ascribed the formula I above, they may also be represented by either or both of the following tautomeric formulae IA and IB, and any specific compound of the invention may occur in any of these tautomeric forms or as a mixture of two or all thereof.

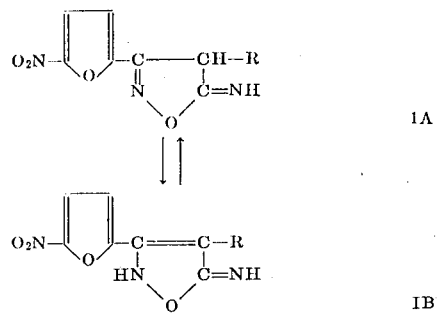

In this specification, however, the compounds are regarded for purposes of clarity as having the formula I and are thus described and exemplified as being nitrofuryl-isoxazole derivatives.

The compounds of the invention have useful pharmacological and, in particular, antimicrobial properties, being valuable antibacterial, antifungal, antiviral, anthelmintic, coccidiostatic or growth-promoting agents for external or internal pharmaceutical uses.

The novel compounds according to the invention have been found to exhibit outstanding antimicrobial activities, in particular antibacterial activity. In living organisms they are active, for example, against general Staphylococcal infections and infections due to *Salmonella* and *Escherichia coli* species.

The following compounds have been demonstrated to be effective as bacteriostatic agents against *Staphylococcus aures*, *Escherichia coli*, and *Mycobacterium tuberculosis* (isonicotinoyl hydrazide resistant and streptomycin resistant strains).

The compounds are particularly valuable in the treatment of infections of the intestinal or urinary tract. The compounds may also be used to protect an organic material susceptible to bacterial, fungal or other microbial deterioration by contacting with, impregnation in or otherwise treating the material with the compounds.

Accordingly, the invention also provides a composition comprising an antimicrobially effective proportion of a 5-nitro-2-furyl-isoxazole of formula I and a pharmacologically acceptable solid carrier or liquid diluent.

The pharmaceutical compositions according to the invention contain at least one compound of general formula I as active substance together with a conventional pharmaceutical carrier. The type of carrier actually used depends to a great extent on the intended application: for external use, for example in disinfecting healthy skin, disinfecting wounds and in treating dermatoses and affections of the mucous membranes caused by bacteria ointments, powders and tinctures are used in particular. The ointment bases may be anhydrous, for instance they can consist of mixtures of wool fat and soft paraffin, or they can consist of aqueous emulsion in which the active substance is suspended. Suitable carriers for powders are, for instance, rice starch and other starches; the bulk weight of the carriers may be made lighter, if desired, for example by adding highly dispersed silicic acid, or may be made heavier by adding talcum. The tinctures may contain at least one active ingredient of the formula I in aqueous ethanol, in particular 45 percent to 75 percent ethanol, to which 10 percent to 20 percent of glycerol may be added, if desired. Solutions prepared from polyethylene glycol and other conventional solubility promoters, and also optionally, from emulsifying agents, may be used with particular advantage in disinfecting healthy skin. The content of active ingredient in pharmaceutical compositions for external application is preferably in the range of from 0.1 percent to 5 percent.

Gargles or concentrates for their preparation, and tablets for slow dissolution in the mouth, are suitable for the disinfection of the mouth and throat. The former are preferably prepared from alcoholic solutions containing 1 percent to 5 percent of active substance to which glycerol or flavorings may be added. Lozenges, that is solid dosage units, preferably have a relatively high content of sugar or similar substances and a relatively low content of active substance, for instance 0.2 percent to 20 percent by weight, as well as the usual conventional additives such as binding agents and flavorings.

Solid dosage units, in particular tablets, dragees (sugar coated tablets) and capsules, are convenient for use in intestinal disinfection and for the oral treatment of urinary tract infections. These units preferably contain from 10 percent to 90 percent of the compound of the general formula I to enable the administration of daily doses of from 0.1 to 2.5 grams to adults, or of suitably reduced doses to children, to be made. Tablets and dragee cores are produced by combining the compounds of the general formula I with solid, pulverulent carriers such as lactose, saccharose, sorbitol, maize starch, potato starch or amylopectin, cellulose derivatives or gelatines, preferably with the addition of lubricants such as magnesium or calcium stearate or polyethylene glycols of suitable molecular weights. Dragee cores may then be coated, for example with concentrated sugar solutions which can also contain gum arabic, talcum and/or titanium dioxide, or they may be coated with a lacquer dissolved in volatile organic solvents or mixture of solvents. Dyestuffs can be added to these coatings, for instance to differentiate between varying dosages. Soft gelatine capsules and other closed capsules consist, for example, of a mixture of gelatines and glycerol and may contain, for example, mixtures of the compound of formula I with polyethylene glycol. Hard gelatin capsules contain, for example, granulates of an active substance with solid pulverulent carriers, for instance lactose, saccharose, sorbitol, mannitol, starches (such as potato starch, maize starch or amylopectin), cellulose derivatives of gelatines, and magnesium stearate or stearic acid.

In all forms for administration, compounds of the general formula I can be present as sole active ingredients or they can also be combined with other known pharmacologically active, and especially antibacterial and/or antimycotically or other antimicrobially active substances, for example, to broaden the range of application. They can be combined for example, with 5,7-dichloro-2-methyl-8-quinolinol or other derivatives of 8-quinolinol, with sulfamerazine or sulfafurazole or other derivatives of sulfanilamide, with chloramphenicol or tetracycline or other antibiotics, with 3,4′,5-tribromosalicylanilide or other halogenated salicylanilides, with halogenated carbanilides, with halogenated benzoxazoles or benzoxazolones, with polychlorohydroxydiphenylmethanes, with halogendihydroxy-diphenyl sulphides, with 4,4′-dichloro-2-hydroxy-diphenylether or 2′,4, 4′-trichloro-2-hydroxydiphenylether or other polyhalogenhydroxydiphenylethers, or with bactericidal quaternary compounds or with certain dithiocarbamic acid derivatives such as tetramethylthiuram disulphide. Also, carriers which themselves have favorable pharmacological properties may be used, for instance sulphur as powder base or zinc stearate as a component of ointment bases.

The invention also provides a method of protecting an organic material susceptible to bacterial, fungal or other microbial attach which comprises treating the material with a 5-nitro-2-furyl-isoxazole of formula I. The organic material may be, for instance, a natural or synthetic polymeric material, a proteinaceous or carbohydrate substance, or a natural or synthetic fiber or textile material formed therefrom.

The following Examples further illustrate the present invention. The temperatures are given in degrees Centigrade.

EXAMPLE 1

A solution of 1.15 g of metallic sodium dissolved in 20 ml of anhydrous methanol was added slowly to a mixture of 9.5 g of 5-nitro-2-furohydroxamoylchloride and 3.3 g of malononitrile dissolved in 80 ml of anhydrous methanol at 20° to 25°.

After allowing to stand, the crystalline precipitate was collected, washed with water and recrystallized from a mixture of water and dimethylformamide. The product was 3-(5′-nitrofuryl-2′)-4-cyano-5-aminoisoxazole, having melting point 263° with decomposition.

EXAMPLE 2

The procedure described in Example 1 was carried out using the molecular equivalent of cyanacetamide as starting material instead of the malononitrile, the reaction conditions being otherwise essentially the same.

The product was 3-(5′-nitrofuryl-2′)-4-carbamoyl-5-aminoisoxazole, having melting point 212° with decomposition.

EXAMPLE 3

A solution of 1.15 g of metallic sodium dissolved in 20 ml of anhydrous methanol was added slowly to a mixture of 9.5 g of 5-nitro-2-furohydroxamoylchloride and 7.6 g of 1-cyanoacetylpyrrolidine dissolved in 120 ml of anhydrous methanol at 20° to 25°.

After allowing to stand, the crystalline precipitate was collected, washed with water and recrystallized from a mixture of water and dimethylformamide.

The product was 3-(5′-nitrofuryl-2′)-4-pyrrolidinocarbonyl-5-amino-isoxazole, having melting point 186°.

The 1-cyanoacetylpyrrolidine used as reactant in the process of Example 3 was prepared by the following method:

A mixture of 113 g of ethyl cyanoacetate and 71 g of pyrrolidine was heated at 110° in a distillation apparatus until the distillation of liberated alcohol ceased. After cooling, the residue was recrystallized from ethyl acetate. The product was 1-cyanoacetylpyrrolidine, having melting point 70°.

EXAMPLE 4

The procedure described in Example 3 was carried out using the molecular equivalent of 1-cyanoacetylpiperidine as starting material instead of the 1-cyanoacetylpyrrolidine, the reaction conditions being otherwise essentially the same.

The product was 3-(5′-nitrofuryl-2′)-4-piperidinocarbonyl-5-amino-isoxazole, having melting point 188° with decomposition.

EXAMPLE 5

The procedure described in Example 3 was carried out using the molecular equivalent of ethyl cyanoacetylcarbamate as starting material instead of 1-cyanoacetylpyrrolidine, the reaction conditions being otherwise essentially the same. The product was 3-(5′-nitrofuryl-2′)-4-ethoxycarbonylcarbamoyl-5-amino-isoxazole, having melting point 218° with decomposition.

EXAMPLE 6

A solution of 2.3 g of metallic sodium dissolved in 40 ml of anhydrous ethanol was added slowly to a mixture of 19.1 g of 5-nitro-2-furohydroxamoyl chloride and 11.3 g of ethyl cyanoacetate dissolved in 120 ml of anhydrous ethanol at 20° to 25°.

After allowing to stand, the crystalline precipitate was collected, washed with water and recrystallized from a mixture of water and dimethylformamide.

The product was 3-(5'-nitrofuryl-2')-4-ethoxycarbonyl-5-amino-isoxazole, having melting point 200°.

EXAMPLE 7

The procedure described in Example 3 was carried out using the molecular equivalent of N-cyanoacetylmorpholine as starting material instead of the 1-cyanoacethylpyrrolidine, the reaction conditions being otherwise essentially the same.

The product was 3-(5'-nitrofuryl-2')-4-morpholinocarbonyl-5-amino-isoxazole, having melting point 245° with decomposition.

EXAMPLE 8

The procedure described in Example 3 was carried out using the molecular equivalent of cyanoacetyl urea as starting material instead of 1-cyanoacetylpyrrolidine, the reaction conditions being otherwise essentially the same.

The product was 3-(5'-nitrofuryl-2')-4-ureidocarbonyl-5-amino-isoxazole having melting point 208° with decomposition.

EXAMPLE 9

The procedure described in Example 3 was carried out using the molecular equivalent of β-(N-cyanoacetylamino)-ethanol as starting material instead of 1-cyanoacetylpyrrolidine, the reaction conditions being otherwise essentially the same.

The product was 3-(5'-nitrofuryl-2')-4-(β-hydroxyethyl-carbamoyl)-5-amino-isoxazole, having melting point 209° with decomposition.

EXAMPLE 10

A mixture of 15 g of 3-(5'-nitrofuryl-2')-4-carbamoyl-5-amino-isoxazole and 40 g of phosphorus oxychloride was heated at 100° for 2 hours. After cooling, 100 ml of water were added slowly to the mixture with further cooling and the precipitate was collected, washed with water and recrystallized from a mixture of water and dimethylformamide.

The product was 3-(5'-nitrofuryl-2')-4-cyano-5-amino-isoxazole, having melting point 263° with decomposition, identical with the product obtained in Example 1.

EXAMPLE 11

A solution of 2.3 g of metallic sodium dissolved in 40 ml of anhydrous methanol was added slowly to a mixture of 19.1 g of 5-nitro-2-furohydroxamoyl chloride and 9.9 g of methyl cyanoacetate dissolved in 120 ml of anhydrous methanol at 20° to 25°.

After allowing to stand, the crystalline precipitate was collected, washed with water and recrystallized from a mixture of water and dimethylformamide.

The product was 3-(5'-nitrofuryl-2')-4-methoxycarbonyl-5-amino-isoxazole having melting point 240° with decomposition.

EXAMPLE 12

The procedure described in Example 11 was carried out using the molecular equivalent of isopropyl cyanoacetate as starting material instead of the methyl cyanoacetate, the reaction conditions being otherwise essentially the same.

The product was 3-(5'-nitrofuryl-2')-4-isopropoxycarbonyl-5-amino-isoxazole having melting point 174°.

EXAMPLE 13

The procedure described in Example 11 was carried out using the molecular equivalent of allyl cyanoacetate as starting material instead of methyl cyanoacetate, the reaction conditions being otherwise essentially the same.

The product was 3-(5'-nitrofuryl-2')-4-allyloxycarbonyl-5-amino-isoxazole having melting point 124°.

EXAMPLE 14

The procedure described in Example 11 was carried out using the molecular equivalent of cyclohexyl cyanoacetate as starting material instead of the methyl cyanoacetate, the reaction conditions being otherwise essentially the same.

The product was 3-(5'-nitrofuryl-2')-4-cyclohexyloxycarbonyl-5-amino-isoxazole having melting point 170°.

Similarly, by using n-hexyl cyanoacetate instead of the methyl cyanoacetate, the product obtained is 3-(5'-nitrofuryl-2')-4-(n-hexyloxycarbonyl)-5-amino-isoxazole, having melting point 185° to 187°.

EXAMPLE 15

The procedure described in Example 3 was carried out using the molecular equivalent of N-methyl-cyanoacetamide as starting material instead of the 1-cyanoacetylpyrrolidine, the reaction conditions being otherwise essentially the same.

The product was 3-(5'-nitrofuryl-2')-4-methylcarbamoyl-5-amino-isoxazole having melting point 238° with decomposition.

EXAMPLE 16

The procedure described in Example 3 was carried out using the molecular equivalent of N-ethyl-cyanoacetamide as starting material instead of the 1-cyanoacetylpyrrolidine, the reaction conditions being otherwise essentially the same.

The product was 3-(5'-nitrofuryl-2')-4-ethylcarbamoyl-5-amino-isoxazole having melting point 206° with decomposition. EXAMPLE Example 17

The procedure described in Example 3 was carried out using the molecular equivalent of N-allyl-cyanoacetamide as starting material instead of the 1-cyanoacetyl-pyrrolidine, the reaction conditions being otherwise essentially the same.

The product was 3-(5'-nitrofuryl-2')-4-allylcarbamoyl-5-amino-isoxazole having melting point approximately 220°.

EXAMPLE 18

By carrying out the procedure described in Example 3 using the molecular equivalent of any of the following amine reactants as starting material instead of the 1-cyanoacetylpyrrolidine there used:

N-cyanoacetylamino-n-propanol

N-cyanoacetyl-β-bromo-ethylamine the reaction conditions being otherwise the same, the following products are obtained respectively:

3-(5'-nitrofuryl-2')-4-γ-hydroxypropylcarbamoyl-5-amino-isoxazole, 3-(5'-nitrofuryl-2')-4-β-bromoethylcarbamoyl-5-aminoisoxazole.

EXAMPLE 19

By carrying out the procedure described in Example 5, using the molecular equivalent of methyl cyanoacetylcarbamate, isopropyl cyanoacetylcarbamate or n-amyl cyanoacetylcarbamate, instead of the ethyl cyanoacethylcarbamate there used, the reaction conditions being otherwise essentially the same, 3-(5'-nitrofuryl-2')-4-(methoxycarbonyl-carbamoyl)-5-aminoisoxazole, 3(5'-nitrofuryl-2')-4-(isopropoxycarbonyl-carbamoyl)-5-amino-isoxazole or 3-(5'-nitrofuryl-2')-4-(n-amyloxycarbonylcarbamoyl)-5-amino-isoxazole, is obtained respectively.

EXAMPLE 20

By carrying out the procedure described in Example 3 using the molecular equivalent of any of the following amines instead of the 1-cyanoacetylpyrrolidine there used:

1-cyanoacetyl-ethylpiperidine 1-cyanoacetyl-thiomorpholine the reaction conditions being otherwise essentially the same, the following products are obtained, respectively:

3-(5'-nitrofuryl-2')-4-ethylpiperidinocarbonyl-5-aminoisoxazole, 3-(5'-nitrofuryl-2')-4-thiomorpholinocarbonyl-5-aminoisoxazole.

EXAMPLE 21

The procedure described in Example 11 was carried out using the molecular equivalent of tertiary butyl cyanoacetate as starting material instead of the methyl cyanoacetate, the reaction conditions being otherwise essentially the same.

The product was 3-(5'-nitrofuryl-2')-4-(tertiarybutoxycarbonyl)-5-amino-isoxazole having melting 171°.

EXAMPLE 22

The procedure described in Example 11 was carried out using the molecular equivalent of β-chloroethyl cyanoacetate as starting material instead of the methyl cyanoacetate, the reaction conditions being otherwise essentially the same.

The product was 3-(5'-nitrofuryl-2')-4-(β-chloroethoxycarbonyl)-5-amino-isoxazole, having melting point initially at 152° following by resetting with subsequent melting at 158°.

Similarly by using the molecular equivalent of any of the cyanoacetates instead of the β-chloroethyl cyanoacetates:

β-chloropropyl cyanoacetate
γ-chloropropyl cyanoacetate
β-bromoethyl cyanoacetate
n-propyl cyanoacetate
isobutyl cyanoacetate
secondary-butyl cyanoacetate
ω-hydroxy-n-hexyl cyanoacetate
δ-hydroxy-n-butyl cyanoacetate
β-methoxy-ethyl cyanoacetate the following products are obtained, respectively:

3-(5'-nitrofuryl-2')-4-(β-chloropropoxy-carbonyl)-5-aminoisoxazole, 3-(5'-nitrofuryl-2')-4-(γ-chloropropoxy-carbonyl)-5-aminoisoxazole having melting point 158°, 3-(5'-nitrofuryl-2')-4-(β-bromoethoxy-carbonyl)-5-aminoisoxazole, 3-(5'-nitrofuryl-2')-4-(n-propoxy-carbonyl)-5-amino-isoxazole having melting point 186°, 3-(5'-nitrofuryl-2')-4-(isobutoxy-carbonyl)-5-amino-isoxazole having a melting point 175°, 3-(5'-nitrofuryl-2')-4-(secondary-butoxy-carbonyl)-5-amino isoxazole having melting point 126°, 3-(5'-nitrofuryl-2')-4-(ω-hydroxy-n-hexyloxy-carbonyl)-5-amino-isoxazole, 3-(5'-nitrofuryl-2')-4-(δ-hydroxy-n-butoxy-carbonyl)-5-amino-isoxazole, 3-(5'-nitrofuryl-2')-4-(β-methoxy-ethoxy-carbonyl)-5-amino-isoxazole.

EXAMPLE 23

By carrying out the procedure described in Example 3 using the molecular equivalent of any of the following amine reactants as starting material instead of the malononitrile there used:

N-cyanoacetyl-sec-octylamine
N-cyanoacetyl-n-dodecylamine
N-cyanoacetyl-cyclohexylamine
N-cyanoacetyl-β-bromoethylamine
N-cyanoacetyl-γ-methoxypropylamine
N-cyanoacetyl-γ-isopropoxypropylamine the reaction conditions being otherwise the same, the following products are obtained respectively:

3-(5'-nitrofuryl-2')-4-sec-octylcarbamoyl-5-amino-isoxazole, 3-(5'-nitrofuryl-2')-4-n-dodecylcarbamoyl-5-amino-isoxazole, 3-(5'-nitrofuryl-2')-4-cyclohexylcarbamoyl-5-amino-isoxazole, 3-(5'-nitrofuryl-2')-4-β-bromoethylcarbamoyl-5-amino-isoxazole, 3-(5'-nitrofuryl-2')-4-γ-methoxypropylcarbamoyl-5-aminoisoxazole, 3-(5'-nitrofuryl-2')-4-γ-isopropoxypropylcarbamoyl-5-aminoisoxazole.

These compounds, their functional derivatives, or mixture of any two or more thereof may be formulated in a conventional manner with pharmacologically acceptable solid carriers or liquid diluents.

We claim:

1. A pharmaceutical composition comprising an antifungal and antibacterial effective amount of a 5-nitro-2-furylisoxazole of the formula

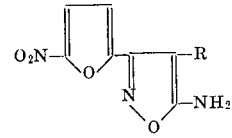

wherein

R is -CN, -COOR$_1$, or $-CON\begin{subarray}{l}R_2\\R_3\end{subarray}$ in which
- R₁ is alkyl of one to six carbon atoms which is unsubstituted
  - or substituted by hydroxy, halo or alkoxy of from one to four carbon atoms; alkenyl of three or four carbon atoms; or cycloalkyl of from five to seven carbon atoms; and
- R₂ is hydrogen;
- R₃ is hydrogen; alkyl of from one to 12 carbon atoms which is
  - unsubstituted or substituted by hydroxy, halo or alkoxy of from one to four carbon atoms; alkenyl of three or four carbon atoms;
  - alkoxycarbonyl on which the alkoxy group has from one to five carbon atoms; or carbamoyl; or
- R₂ and R₃ taken together, together with the nitrogen atom
  - to which they are attached are pyrrolidino, piperidino, morpholino, thiomorpholino, piperazino or 4-lower alkylpiperazino, and a pharmacologically acceptable solid carrier or liquid diluent compatible with said isoxazole.

2. The composition of claim 1, wherein the active ingredient is 3-(5'-nitrofuryl-2')-4-cyano-5-amino-isoxazole.

3. The composition of claim 1, wherein the active ingredient is 3-(5'-nitrofuryl-2')-4-carbamoyl-5-amino isoxazole.

4. The composition of claim 1, wherein the active ingredient is 3-(5'-nitrofuryl-2')-4-pyrrolidinocarbonyl-5-amino-isoxazole.

5. The composition of claim 1, wherein the active ingredient is 3-(5'-nitrofuryl-2')-4-ethoxycarbonyl-5-amino-isoxazole.

6. The composition of claim 1, wherein the active ingredient is 3-(5'-nitrofuryl-2')-4-(β-hydroxyethyl-carbamoyl)-5-amino-isoxazole.

7. The composition of claim 1, wherein the active ingredient is 3-(5'-nitrofuryl-2')-4-methoxycarbonyl-5-amino-isoxazole.

8. The composition of claim 1, wherein the active ingredient is 3-(5'-nitrofuryl-2')-4-ureidocarbonyl-5-amino-isoxazole.

9. The composition of claim 1, wherein the active ingredient is 3-(5'-nitorfuryl-2')-allyloxycarbonyl-5-amino-isoxazole.

10. The composition of claim 1, wherein the active ingredient is 3-(5'-nitrofuryl-2')-4-isopropoxycarbonyl-5-amino-isoxazole.

11. The composition of claim 1, wherein the active ingredient is 3-(5'-nitrofuryl-2')-4-(β-chloroethoxycarbonyl)-5-amino-isoxazole.

12. A method of controlling bacteria and fungi which comprises contacting said bacteria and fungi with an antibacterial and antifungal effective amount of a compound of the formula

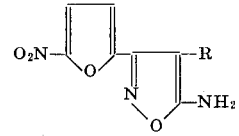

wherein
R is -CN, -COOR₁, or

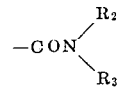

in which
- R₁ is alkyl of one to six carbon atoms which is unsubstituted or
  - substituted by hydroxy, halo or alkoxy of from one to four carbon atoms; alkenyl of three or four carbon atoms; or cycloalkyl of from five to seven carbon atoms; and
- R₂ is hydrogen;
- R₃ is hydrogen; alkyl of from one to 12 carbon atoms which is
  - unsubstituted or substituted by hydroxy, halo or alkoxy of from one to four carbon atoms; alkenyl of three or four carbon atoms; alkoxycarbonyl on which the alkoxy group has from one to five carton atoms; or carbamoyl; or
- R₂ and R₃ taken together, together with the nitrogen atom to which they are attached are pyrrolidino, piperidino, morpholino, thiomorpholino, piperazino or 4-lower alkylpiperazino.

* * * * *